US008841041B2

(12) United States Patent
Biederman et al.

(10) Patent No.: US 8,841,041 B2
(45) Date of Patent: Sep. 23, 2014

(54) INTEGRATION OF AN ORGANIC RANKINE CYCLE WITH A FUEL CELL

(75) Inventors: Bruce P. Biederman, Old Greenwich, CT (US); Lili Zhang, West Hartford, CT (US); John Ferro, Hartland, CT (US); Paul R. Margiott, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1095 days.

(21) Appl. No.: 12/740,473

(22) PCT Filed: Oct. 29, 2007

(86) PCT No.: PCT/US2007/022820
§ 371 (c)(1),
(2), (4) Date: Jul. 28, 2010

(87) PCT Pub. No.: WO2009/058112
PCT Pub. Date: May 7, 2009

(65) Prior Publication Data
US 2010/0291455 A1   Nov. 18, 2010

(51) Int. Cl.
*H01M 8/04* (2006.01)
*F28D 15/00* (2006.01)
(52) U.S. Cl.
CPC ............ *H01M 8/04029* (2013.01); *Y02E 60/50* (2013.01); *F28D 15/00* (2013.01); *H01M 8/04014* (2013.01); *H01M 8/04022* (2013.01); *H01M 8/04059* (2013.01)
USPC ........................................................ 429/434

(58) Field of Classification Search
None
See application file for complete search history.

(56) References Cited

U.S. PATENT DOCUMENTS

| 3,982,962 | A  | * | 9/1976  | Bloomfield ............... 429/423 |
| 4,628,869 | A  |   | 12/1986 | Symsek et al. |
| 6,101,813 | A  |   | 8/2000  | Sami et al. |
| 6,365,289 | B1 | * | 4/2002  | Lee et al. ................. 429/429 |
| 6,883,328 | B2 |   | 4/2005  | Bronicki |
| 6,884,528 | B2 |   | 4/2005  | Lee et al. |
| 6,902,838 | B2 |   | 6/2005  | Lee et al. |
| 7,067,211 | B2 |   | 6/2006  | Lee et al. |
| 7,097,925 | B2 | * | 8/2006  | Keefer ............................. 429/9 |

(Continued)

FOREIGN PATENT DOCUMENTS

DE      102004063304 A1    9/2005

OTHER PUBLICATIONS http://powerquality.eaton.com/Products-services/Power-Conditioning/EVR.asp?cx=3.*
European Search Report mailed Feb. 15, 2012.

(Continued)

*Primary Examiner* — Patrick Ryan
*Assistant Examiner* — Christopher Domone
(74) *Attorney, Agent, or Firm* — Carlson, Gaskey & Olds, P.C.

(57) ABSTRACT

An Organic Rankine Cycle system is combined with a fuel cell system, with the working fluid of the Organic Rankine Cycle system being integrated directly into the cooling system for the fuel cell. The waste heat from the fuel cell is therefore applied directly to preheat and evaporate the working fluid in the Organic Rankine Cycle system to thereby provide improved efficiencies in the system.

26 Claims, 3 Drawing Sheets

(56) References Cited

U.S. PATENT DOCUMENTS

2003/0012985 A1* 1/2003 McAlister .................. 429/12
2003/0224238 A1* 12/2003 Finn et al. .................. 429/35
2005/0006957 A1 1/2005 Bronicki
2005/0106429 A1* 5/2005 Keefer ...................... 429/20
2006/0010872 A1* 1/2006 Singh et al. ................ 60/671
2006/0083964 A1* 4/2006 Edlinger et al. ............ 429/17

OTHER PUBLICATIONS

International Search Report and Written Opinion mailed Jul. 29, 2008 (9 pgs.).
International Preliminary Report on Patentability mailed May 14, 2010 (5 pgs.).

* cited by examiner

INTEGRATION OF AN ORGANIC RANKINE CYCLE WITH A FUEL CELL

TECHNICAL FIELD

This disclosure relates generally to fuel cell power plants and, more particularly, to a method and apparatus for using an Organic Rankine Cycle system in combination therewith.

BACKGROUND OF THE DISCLOSURE

A fuel cell is an electrochemical cell which consumes fuel and an oxidant on a continuous basis to generate electrical energy. The fuel is consumed at an anode and the oxidant at a cathode. The anode and cathode are placed in electrochemical communication by an electrolyte. One typical fuel cell employs a phosphoric acid electrolyte. The phosphoric acid fuel cell uses air to provide oxygen as an oxidant to the cathode and uses a hydrogen rich stream to provide hydrogen as a fuel to the anode. After passing through the cell, the depleted air and fuel streams are vented from the system on a continuous basis.

A typical fuel cell power plant comprises one or more stacks of fuel cells, the cells within each stack being connected electrically in series to raise the voltage potential of the stack. A stack may be connected in parallel with other stacks to increase the current generating capability of the power plant. Depending upon the size of the power plant, a stack of fuel cells may comprise a half dozen cells or less, or as many as several hundred cells. Air and fuel are usually fed to the cells by one or more manifolds per stack.

In each of the fuel cells, waste heat is a by-product of the steam reforming process for conversion of fuel to a hydrogen rich steam, electrochemical reactions and the heat generation associated with current transport within the cell components. Accordingly, a cooling system must be provided for removing the waste heat from a stack of fuel cells so as to maintain the temperature of the cells at a uniform level which is consistent with the properties of the material used in the cells and the operating characteristics of the cells.

In the stack, where the chemical reactions take place, water is used to cool the stack and generate steam to be used in the furnace, where chemical reactions occur to generate hydrogen. The waste heat, which is at around 500° F. and includes water, exit air and depleted fuel, is directed to a waste heat recovery loop to provide the customer with low grade heat (i.e. 20-80 kw). The heat recovery loop often includes a condenser coupled with a glycol loop and a heat exchanger that couples the water system with the glycol loop. The customer can also get high grade heat (i.e. 284 kw) via the water which receives heat from the stack cooling loop. The heat exchangers that allow the customer to get the high and low grade heat are referred to as the customer water interface.

DISCLOSURE

Briefly, in accordance with one aspect of the disclosure, an Organic Rankine Cycle system is provided, with the Organic Rankine Cycle working fluid being circulated directly through the fuel cell in order to recover waste heat and generate additional electric power to thereby boost the system efficiency of the fuel cell.

In the drawings as hereinafter described, a preferred embodiment is depicted; however, various other modifications and alternate constructions can be made thereto without departing from the spirit and scope of the disclosure.

DETAILED DESCRIPTION OF THE DISCLOSURE

Figure 1:
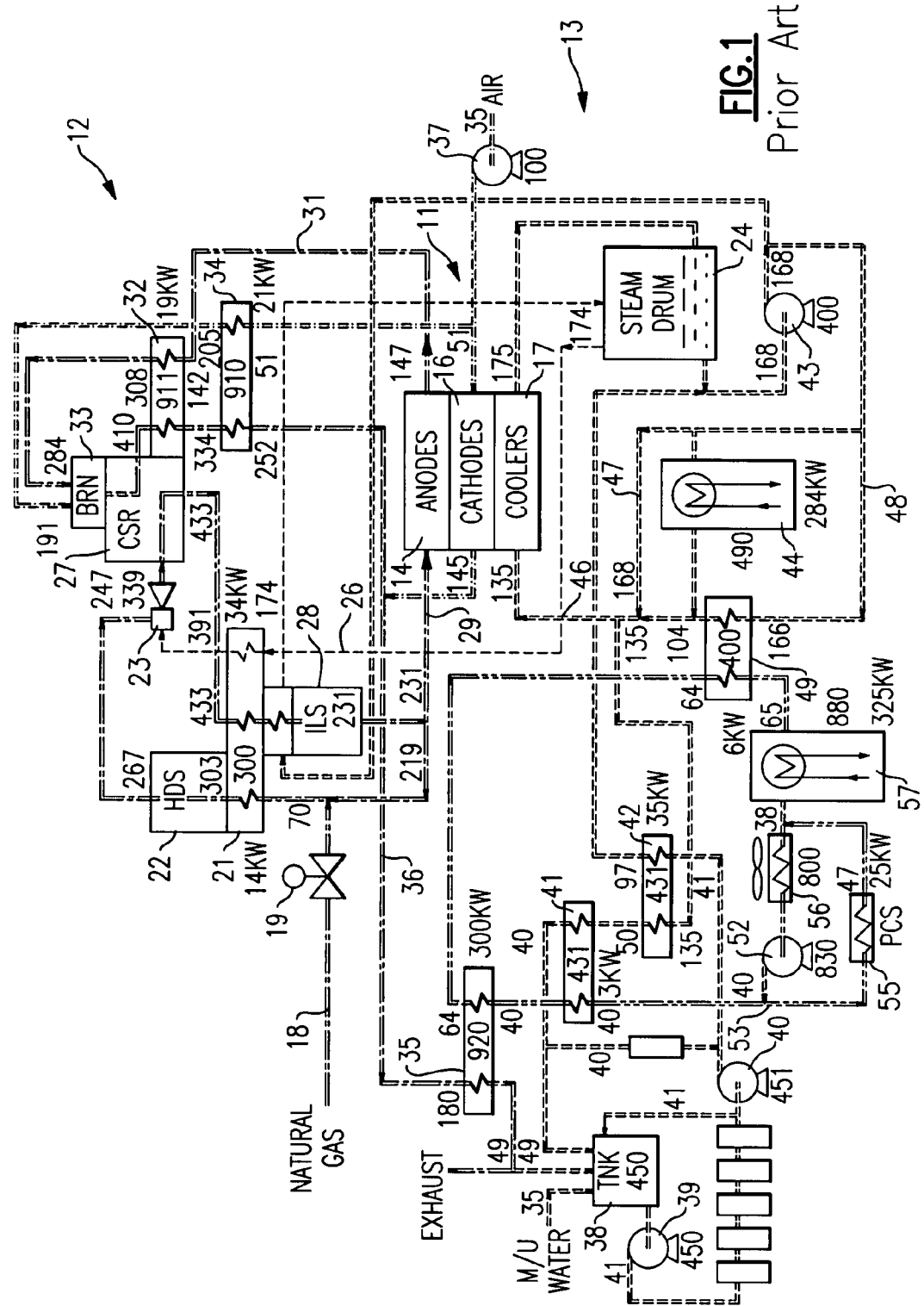
FIG. 1 is a schematic illustration of a fuel cell and its waste heat proceeding loop in accordance with the prior art.

Shown in FIG. 1 is a phosphoric acid fuel cell system which generally includes a fuel cell stack 11, a fuel processing loop 12 and a waste heat processing loop 13. The fuel cell stack includes a plurality of electrochemical cells with each cell having an anode, a cathode, and a cooler for processing the waste heat that is generated from the cell. The collective anodes, cathodes and coolers for the plurality of cells in the stack are indicated at 14, 16 and 17, respectively.

Within the anodes 14, a supply of hydrogen is provided by the fuel processing loop 12 to fuel the chemical reactions within the anodes 14 in a manner to be described hereinafter. Similarly, within the cathodes 16, a supply of ambient air is provided as an oxide for fueling the chemical reaction within the cathode 16 in a manner to be described hereinafter. Finally, the coolers 17 are fluidly connected to the waste heat processing loop 13 to remove heat from the fuel cell stack 11 in a manner to be described hereinafter.

Referring first to the fuel processing loop 12 as shown by the lines (red), the flow sequence along that loop will now be described, with the various typical temperatures, in degrees centigrade, being shown at the various locations indicated.

A supply of natural gas is provided along line 18 through valve 19 to a heat exchanger 21, where the temperature of the gas is raised from 70° C. to 303° C. The heated gas then flows to a hydro-desulphurizer 22 where the sulphur is removed from the natural gas. The gas then flows to an ejector 23 where it is mixed with steam from a steam drum 24 along line 26. The mixture then flows through the cell stack reformer 27 where the $CH_4$ (methane) and $H_2O$ is reformed into $CO_2$ and $H_2$ and trace amounts of CO. The cell stack reformer 27 is heated by a burner 33 to cause an endothermic reaction to complete the reforming process. The reformed product then flows to the heat exchanger 21 where it gives up some heat and then enters the low temperature shift converter 28 where the CO is converted to $H_2$ and $CO_2$.

From the low temperature shift converter 28 the hydrogen gas passes to line 29 where it flows in both directions. That is, a portion of it flows to mix with the supply of natural gas and a portion of it flows to the anodes 14 to fuel the chemical reactions in the anodes 14. The resultant gas then leaves the anodes along line 31 to enter a heat exchanger 32, where it picks up heat and then flows to the burner 33. The exhaust gases then flow back through the heat exchanger 32 and through heat exchanger 34 prior to flowing into the line 36 of the waste heat processing loop. There it is mixed with heated air in a manner to be described, with the mixture flowing through heat exchanger 35 and then to ambient.

Turning now to the fuel for the cathodes 16, a compressor 37 provides compressed ambient air to the cathodes 16 for use of the oxygen therein as fuel for the chemical reactions in the cathodes 16. The waste gases then exit the cathodes 16 and pass to the line 36 where they are mixed with the exhaust gases from the burner 33 as described above. The flow of air is shown by lines (green).

A portion of the compressed air from the compressor 37 is passed through the heat exchanger 34 to be heated and then passes to the burner 33 to be mixed with the gas from the anodes 14 for combustion within the burner 33.

Referring now to the waste heat processing loop 13, there is a water loop as shown by the lines (blue) and a glycol loop as shown by the lines (purple). A description will first be made of the water lines within the waste heat processing loop 13.

A supply of water stored in a tank 38 is pumped by pumps 39 and 40 to one side of a heat exchanger 42 where it picks up heat and is then mixed with a supply of hot water from the steam drum 24 prior to passing to a pump 43. The stream of hot water then flows to a high grade heat exchanger 44 for the transfer of heat which is then available to the customer.

After passing through the heat exchanger 44, the water passes along line 46 to the coolers 17 where it is converted to steam which flows to the steam drum 24. A portion of the water passes from the pump 43 to the low temperature shift converter 28 where it is converted to steam which also passes to the steam drum 24.

A portion of the hot water from the pump 43 is also divided between lines 47 and 48, with the flow of line 47 going directly to the cooler 17 and the flow from line 48 passing through one side of a heat exchanger 49 prior to passing to the cooler 17. A portion of the water from line 46 passes through the other side of the heat exchanger 42, through one side of heat exchanger 41 and then to the tank 38.

Also included as part of the waste heat processing loop 13 is the glycol loop 51 shown in lines (purple). Circulation of the glycol within its loop is caused by the pump 52 which discharges to line 53 where it flows in two directions. A portion of the flow passes through a heat exchanger 55 in the power conditioning system (PCS) for cooling the PCS. It then passes through a fan cooled radiator 56 for the purpose of cooling the glycol and then back to the pump 52.

Another portion of the glycol passes through the other side of the heat exchanger 41, through the other side of the heat exchanger 35, and then through the other side of the heat exchanger 49. Finally, it passes through the heat exchanger 57 where the low grade heat is transferred to the customer to be used as.

Figure 2:
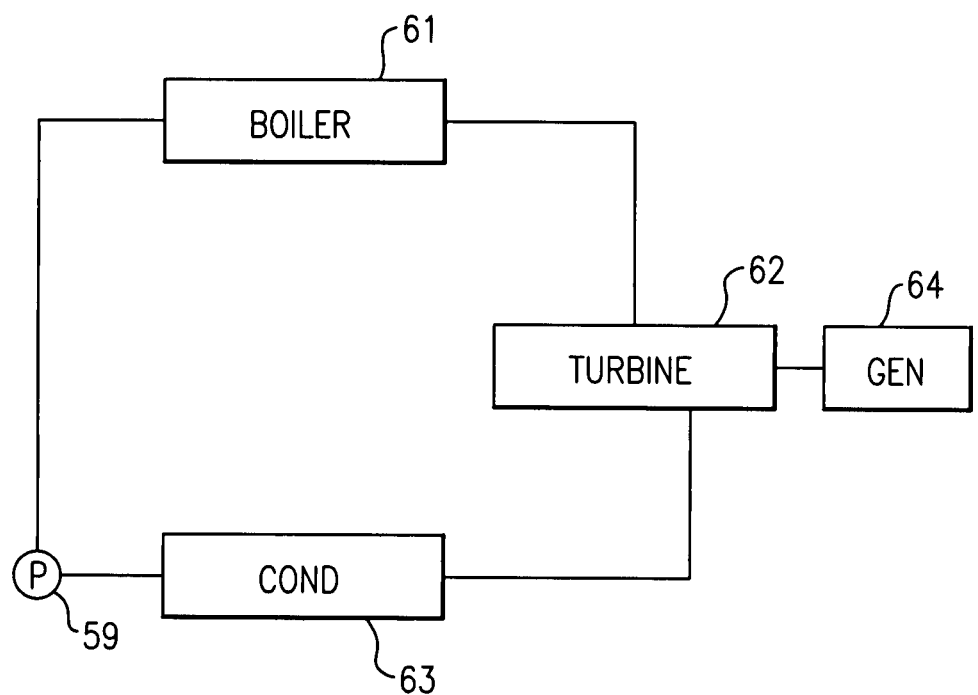
FIG. 2 is a schematic illustration of an Organic Rankine Cycle in accordance with the prior art.

Referring now to FIG. 2, an Organic Rankine Cycle 58 is shown to include, in serial flow relationship, a pump 59, an evaporator or a boiler 61, a turbine 62 and a condenser 63. The heat for the boiler 61 can be from any suitable heat source such as waste heat from a gas turbine, or heat from geothermal sources, for example. The turbine 62 is generally mechanically connected to a generator 64 for purposes of generating electricity. In this way, heat that may otherwise be lost to the atmosphere is applied to the Organic Rankine Cycle system to generate electricity.

Figure 3:
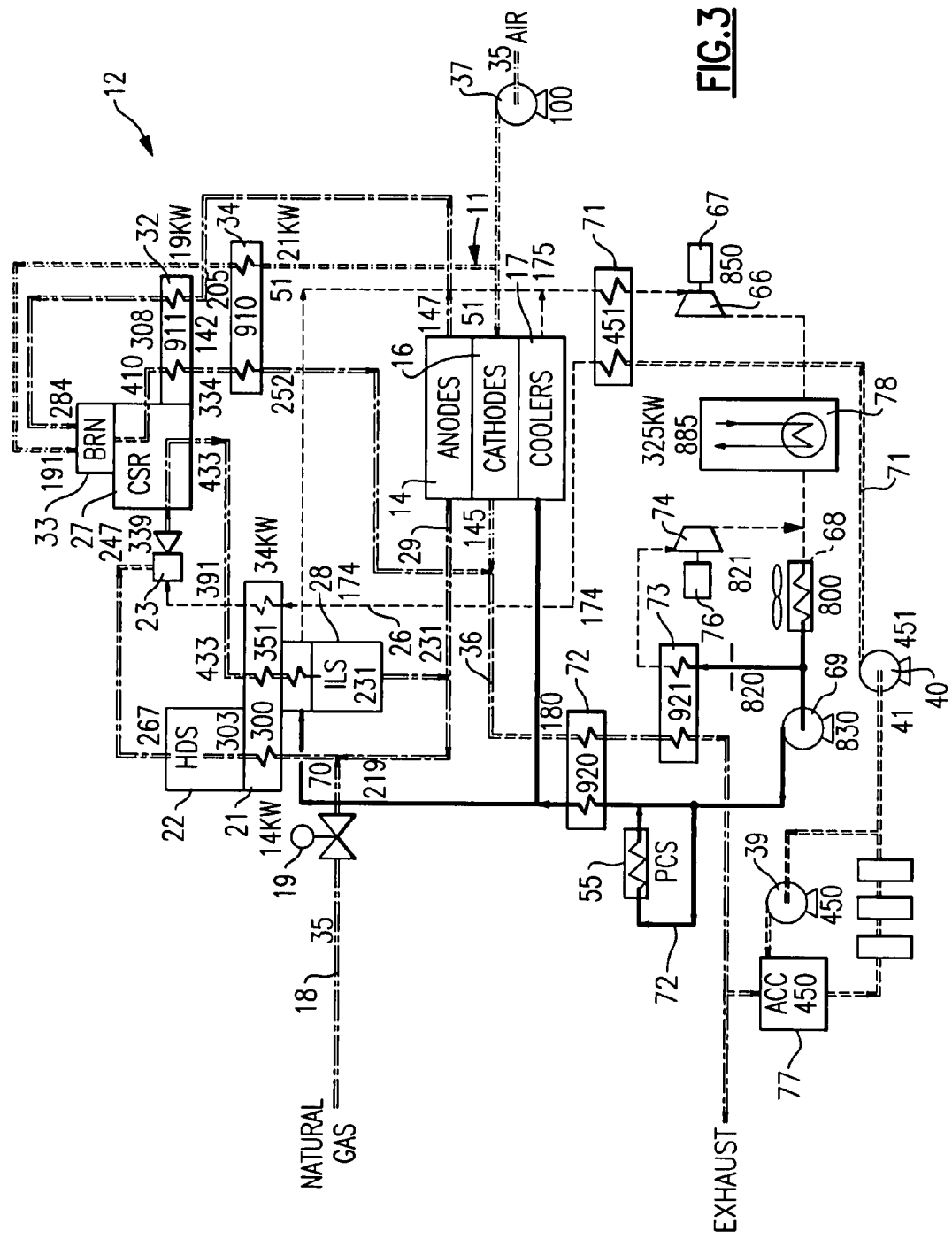
FIG. 3 is a schematic illustration of an Organic Rankine Cycle as integrated into a fuel cell in accordance with the present disclosure.

Referring now to FIG. 3, it will be seen how an Organic Rankine Cycle system has been integrated into the cooling loop of the fuel cell.

The various elements of an Organic Rankine Cycle system are shown to include a turbine 66 for driving a generator 67, a condenser 68 and a pump 69. However, rather than the conventional evaporator or boiler of the prior art Organic Rankine Cycle the working fluid of the Organic Rankine Cycle, which may be any suitable refrigerant such as R-245-fa, is routed to the coolers 17 such that the working fluid provides the cooling to the fuel cell stack 11 while, at the same time, the coolers act as a boiler for the Organic Rankine Cycle system, converting the liquid refrigerant coming into the cooler 17 to a vapor which first flows through one side of a heat exchanger 71 and then to the turbine 66 for providing motive power thereto.

It should be recognized that the steam drum of the prior art has been eliminated as a necessary element. However, there is still a need for steam flow to the ejector 23 and the cell stack reformer 27. Accordingly, the water line 71 is passed through the other side of heat exchanger 71 in order to generate steam for the ejector 23 and the cell stack reformer 27.

It should also be recognized that the glycol loop of the prior art has been eliminated as a necessary portion of the waste heat processing loop. Accordingly, certain functions of those loops have been accomplished by different arrangements as shown. As will be seen, the power conditioning system (PCS) is now cooled by way of a portion of the Organic Rankine Cycle working fluid which is made to flow along line 72, through the heat exchanger 55 and back to the Organic Rankine Cycle circuit flow path.

Another function of the prior art glycol loop was that of capturing waste heat from the burner which flowed along line 36. Thus, rather than transferring that heat to a glycol loop, it is transferred directly to the Organic Rankine Cycle working fluid by way of the heat exchanger 72. That is, the hot gas by-product of the burner 33 passes along line 36, through one side of the heat exchanger 72, through one side of a heat exchanger 73, whose function is to be described hereinafter, and then exhausts to ambient. The Organic Rankine Cycle working fluid passes through the other side of the heat exchanger 72 where it is preheated prior to flowing to the cooler 17 for evaporation.

It will be seen that the products of combustion from the burner 33, after passing through the heat exchangers 32 and 34, and then which are mixed with hot air in the line 36, arrive at the heat exchanger 72 at a temperature of around 180° C. In the heat exchanger 72, a significant amount of heat is given up to preheat the working fluid. However, because of the temperature difference between the working fluid and the water condensate, not all of the heat is available to be transferred in the heat exchanger 72. In order to maintain the water balance in the fuel cell system, additional cooling is therefore required to fully condense the water vapor in the stream of line 36. This is accomplished in heat exchanger 73 wherein the heat in the water system is used to evaporate the working fluid which is then applied to drive a turbine 74, with the turbine 74 driving a generator 76, and then with the low energy vapor then passing to the condenser 68.

After the water vapor is condensed in the heat exchanger 73, it passes to the ACC 77, with any vapors then passing to ambient. In this way, the water balance is maintained to thereby allow operation at high ambient. This will also duplicate as a purge system for the Organic Rankine Cycle loop.

The condensation of the water vapor can also be implemented by other approaches. For example, if the Organic Rankine Cycle is water cooled, water from the cooling tower can be directed to provide additional cooling. Or with a pump, a radiator and a closed loop circulation of 245-fa, with very little pressure rise/decrease, a system similar to air conditioning can be used to provide additional cooling.

The electricity that is generated by the generators 67 and 76 can be applied to boost the fuel cell efficiency and lower system cost. Further, the coupled fuel cell/Organic Rankine Cycle system can share a common DC bus and/or common grid protection parts to lower the cost of electrical components.

The heat exchanger 78 may be installed to further remove heat from the low energy vapor coming from the turbine 66 to thereby provide customer with heat. This will, in turn, raise the Organic Rankine Cycle condensing temperature.

While the present disclosure has been particularly shown and described with reference to the preferred embodiment as illustrated in the drawings, it will be understood by one skilled in the art that various changes in detail may be effected therein without departing from the spirit and scope of the disclosure as defined by the claims.

We claim:

1. A fuel cell system having a fuel cell stack with a plurality of anodes, cathodes and coolers, a fuel processing loop and a waste heat processing loop wherein said waste heat processing loop comprises:
   a first coolant loop which circulates a first fluid through said coolers to extract heat therefrom;
   a second coolant loop which circulates a second fluid through said anodes to extract heat therefrom, the first coolant loop separate from the second coolant loop;
   a third circuit with a third fluid passing through the cathodes; and
   an Organic Rankine Cycle system having in serial flow relationship a pump, a boiler, a turbine and a condenser, with said first fluid being circulated therethrough as a working fluid.

2. A fuel cell system as set forth in claim 1 wherein the heat transferred vaporizes the working fluid in the boiler.

3. A fuel cell system as set forth in claim 1 and including at least one Organic Rankine Cycle heat exchanger fluidly and operationally connected in said first and second coolant loops for transferring heat from said second loop to said first loop.

4. A fuel cell system as set forth in claim 3 wherein said at least one Organic Rankine Cycle heat exchanger comprises a pre-heater which transfers heat from said second coolant loop to said first fluid at a point between said pump and said coolers.

5. A fuel cell system as set forth in claim 4 where said at least one Organic Rankine Cycle heat exchanger includes a second heat exchanger disposed in second fluid downstream relationship with respect to said preheater.

6. A fuel cell system as set forth in claim 5 wherein said second heat exchanger is applied to condense said second coolant loop and vaporize a portion of said working fluid.

7. A fuel cell system as set forth in claim 6 and including a second turbine and said turbine and said vaporized portion of working fluid is applied to drive said second turbine.

8. A fuel cell system as set forth in claim 1 wherein said third fluid comprises ambient air.

9. A fuel cell system as set forth in claim 8 wherein said third fluid, after passing through said cathodes, is combined with said second fluid.

10. A fuel cell system as set forth in claim 9 wherein said combined fluid is passed through said at least one Organic Rankine Cycle heat exchanger.

11. A fuel cell system as set forth in claim 1 and including a power conditioning system for providing variable electrical power to said fuel cell system.

12. A fuel cell system as set forth in claim 1 and including a power conditioning system heat exchanger for transferring heat to said working fluid.

13. A fuel cell system as set forth in claim 1 wherein said Organic Rankine Cycle turbine is drivingly connected to a generator for generating electricity.

14. A method of using waste heat from a fuel cell system having a fuel cell stack with a plurality of anodes, cathodes and coolers, a fuel processing loop and a waste heat processing loop, comprising the steps of:
   circulating a first fluid in a first coolant loop through said coolers to extract heat therefrom;
   circulating a second fluid in a second coolant loop through said anodes to extract heat therefrom;
   providing an Organic Rankine Cycle system having in serial flow relationship a pump, a boiler, a turbine and a condenser, with said first fluid being circulated therethrough as a working fluid, the first coolant loop separate from the second loop.

15. A method as set forth claim 14 wherein said step of extracting heat to said cooler comprises the step of vaporizing the working fluid in the boiler.

16. A method as set forth in claim 15 and including the step of fluidly and operationally connecting at least one Organic Rankine Cycle heat exchanger in said first and second coolant loops for transferring heat from said second loop to said first loop.

17. A method as set forth in claim 16 wherein said step of transferring heat to said working fluid with said at least one Organic Rankine Cycle heat exchanger is accomplished with a first Organic Rankine Cycle heat exchanger at a point between said pump and said coolers.

18. A method as set forth in claim 17 and including the step of providing a second Organic Rankine Cycle heat exchanger disposed in second fluid downstream relationship with respect to said first Organic Rankine Cycle heat exchanger.

19. A method as set forth in claim 18 and including the steps of applying said second Organic Rankine Cycle heat exchanger to condense said second fluid and vaporize a portion of said working fluid.

20. A method as set forth in claim 19 and including the step of driving a second turbine with said vaporized portion of working fluid.

21. A method as set forth claim 14 and including a third circuit with a third fluid and including the stop of circulating said fifth fluid passing through the cathodes.

22. A method as set forth claim 14 wherein said third fluid comprises ambient air.

23. A method as set forth claim 21 wherein said third fluid, after passing through said cathodes, is combined with said second fluid.

24. A method as set forth claim 23 wherein said combined fluid is passed through said at least one Organic Rankine Cycle heat exchanger.

25. A method as set forth claim 14 wherein said fuel cell system includes a power conditioning system and including the further step of providing variable electrical power from said power conditioning system to said fuel cell system.

26. A method as set forth claim 25 and including the step of transferring heat from said power conditioning system to said working fluid.

* * * * *